(12) United States Patent
Niswander

(10) Patent No.: US 7,195,726 B1
(45) Date of Patent: Mar. 27, 2007

(54) INTERNAL MOLD RELEASE FOR LOW DENSITY REACTION INJECTION MOLDED POLYURETHANE FOAM

(75) Inventor: Ron H. Niswander, Fresno, TX (US)

(73) Assignee: Dow Global Technologies Inc., Midland, MI (US)

( * ) Notice: Subject to any disclaimer, the term of this patent is extended or adjusted under 35 U.S.C. 154(b) by 0 days.

(21) Appl. No.: 09/762,545

(22) PCT Filed: Aug. 26, 1999

(86) PCT No.: PCT/US99/19458

§ 371 (c)(1),
(2), (4) Date: Mar. 28, 2001

(87) PCT Pub. No.: WO00/12607

PCT Pub. Date: Mar. 9, 2000

Related U.S. Application Data

(60) Provisional application No. 60/098,002, filed on Aug. 26, 1998.

(51) Int. Cl.
*B29C 44/02* (2006.01)

(52) U.S. Cl. ........................ 264/51; 264/300; 521/130; 521/131

(58) Field of Classification Search ................ 264/51, 264/300, 331.19; 521/155, 130, 131
See application file for complete search history.

(56) References Cited

U.S. PATENT DOCUMENTS

| | | | | |
|---|---|---|---|---|
| 4,024,088 A | * | 5/1977 | Godlewski | 521/107 |
| 4,201,847 A | | 5/1980 | Kleimann et al. | 521/172 |
| 4,225,228 A | | 9/1980 | DiMatteo | 356/36 |
| 4,254,228 A | | 3/1981 | Kleimann et al. | 521/128 |
| 4,581,418 A | | 4/1986 | Serratelli et al. | 525/404 |
| 4,751,252 A | * | 6/1988 | Clatty | 521/114 |
| 4,785,027 A | | 11/1988 | Brasington et al. | 521/157 |
| 4,868,224 A | | 9/1989 | Harasin et al. | 521/124 |
| 4,965,293 A | | 10/1990 | Sanns, Jr. | 521/124 |
| 5,019,317 A | * | 5/1991 | Slocum et al. | 264/300 |
| 5,208,268 A | * | 5/1993 | Mafoti | 521/115 |
| 5,344,853 A | * | 9/1994 | Knipp et al. | 521/128 |
| 5,389,696 A | | 2/1995 | Dempsey et al. | 521/128 |
| 5,529,739 A | * | 6/1996 | Jonsson et al. | 264/300 |
| 5,670,553 A | * | 9/1997 | Mackey | 521/128 |
| 5,716,548 A | * | 2/1998 | Harrison et al. | 252/357 |
| 6,169,124 B1 | * | 1/2001 | Horn et al. | 521/155 |

FOREIGN PATENT DOCUMENTS

| | | | |
|---|---|---|---|
| JP | 01188511 | | 1/1998 |
| WO | WO 96/08352 | | 3/1996 |
| WO | WO 98/25985 | * | 6/1998 |
| WO | WO 98/41552 | | 9/1998 |

OTHER PUBLICATIONS

Burst, J.M., "Developments in Polyurethanes" Applied Science Publishers, vol. I pp. 1-79 (1978).
Gum, W., W. Reise and H. Ulrich, "Reaction Polymers" Eds., Hanser Publishers (1992).
Saunders and Frisch, "Polyurethanes, Chemistry and Technology" High Polymers vol. XVI, Interscience Publishers, New York. (1962) vol. I, pp. 32-42, 44-54. vol. II pp. 5-6, 198-199 (1994).
Saunders, K. J., "Organic Polymer Chemistry" Chapman and Hall, London. pp. 323-325 (1973).

* cited by examiner

*Primary Examiner*—Allan R. Kuhns

(57) ABSTRACT

A method for preparing a molded polyurethane foam article using an internal mold release composition is provided. More specifically, a method using an IMR agent and an IMR-enhancer compound to prepare a molded polyurethane foam article is provided. The method comprises (a) forming a polyurethane-forming mixture by mixing (i) a fatty acid condensation product, (ii) an IMR-enhancer compound, (iii) an isocyanate, (iv) a polyol, (v) a catalyst, and (vi) a blowing agent; (b) filling a mold with the polyurethane-forming mixture; (c) forming a molded foam article; and (d) removing the molded foam article from the mold. The IMR-enhancer compound is any liquid petroleum product within the viscosity range of products called oils.

12 Claims, No Drawings

INTERNAL MOLD RELEASE FOR LOW DENSITY REACTION INJECTION MOLDED POLYURETHANE FOAM

This application is a 371 of PCT/US99/19458, filed Aug. 26, 1999, which claims the benefit of Provisional Application 60/098,002, filed Aug. 26, 1998.

FIELD OF THE INVENTION

This invention relates to molded foams. More particularly, it relates to a method for preparing a molded polyurethane foam article using an internal mold release composition.

DESCRIPTION OF THE PRIOR ART

Molded polyurethane foams (hereinafter "molded foams") are useful in a variety of applications. For example, molded foams are useful in the construction of furniture, automobiles, and buildings. Molded foams are especially important because they are lightweight and resistant to moisture, weather, temperature extremes, and aging.

Molded foams are produced from foamable reaction mixtures. A foamable reaction mixture minimally contains of an organic polyisocyanate, an active hydrogen containing compound, a catalyst, and a blowing agent.

To obtain a molded foam article, a foamable reaction mixture is injected into a mold, wherein the mixture foams and then solidifies in a compacted state. The mixture takes on the mold's shape and features. Injection molding or reaction injection molding (RIM) processes can be used to prepare the molded foam article.

To facilitate removal of the molded foam article from the mold, an external mold release (EMR) agent can be used to coat the mold. Examples of typically used EMR agents are waxes, soaps, and oils. The EMR agent reduces the mold opening force required to free the molded foam article from the mold.

Unfortunately, the use of EMR agents can have deleterious effects. Residue from the EMR agent can accumulate on the mold surface. The residue can obscure detailed features of the mold, thereby preventing proper imprinting of the features onto the surface of molded foam article. Also, the removal of the residue requires periodic cleaning of the mold. Periodic cleaning results in removing the mold from service, thereby affecting the service time of the mold.

Also, EMR agents can adhere to the surface of the molded foam article and is often removed from the mold surface with the molded foam article. The EMR agents must therefore be replaced to provide continued release of the molded foam articles. The necessity for repeated additions of EMR agent results in additional expense due to both time losses for applying additional quantities of EMR agent to the mold surfaces as well as the cost of the EMR agent itself.

The use of an internal mold release (IMR) agent can alleviate some of the problems associated with the use of an EMR agent alone. IMR agents can be included as integral components of a foamable reaction mixture. Examples of processes for preparing molded foams from a foamable reaction mixture, containing an IMR agent, are disclosed in U.S. Pat. Nos. 4,201,847; 4,254,228; 4.868,224; 5,019,317; and 5,389,696. A foamable reaction mixture containing an organic polyisocyanate and an active hydrogen containing fatty acid ester is specifically disclosed in U.S. Pat. Nos. 4,201,847 and 4,225,228. U.S. Pat. No. 5,389,696 specifically discloses the use of an expensive mixture of fatty esters as an IMR agent.

Unfortunately, IMR agents do not generally function as well as EMR agents. Also, IMR agents can be expensive. Therefore, it would be desirable in the art of preparing molded foam articles to have an IMR composition that reduces the mold opening force required to free a molded foam article from a mold. It would also be desirable to have an IMR composition that reduces the amount of an EMR agent that needs to be applied to a mold's surface. Furthermore, it would be desirable to replace an IMR agent with a less expensive material without adversely affecting the opening force. Moreover, it would also be desirable to reduce the cycle time associated with the use of EMR agents.

SUMMARY OF THE INVENTION

According to the present invention, a method for preparing a molded polyurethane foam article using an internal mold release composition is provided. More specifically, a method using an IMR agent and an IMR-enhancer compound to prepare a molded polyurethane foam article is provided.

In its generic embodiment, the method comprises (a) forming a polyurethane-forming mixture by mixing (i) a fatty acid condensation product, (ii) an IMR-enhancer compound, (iii) an isocyanate, (iv) a polyol, (v) a catalyst, and (vi) a blowing agent; (b) filling a mold with the polyurethane-forming mixture; (c) forming a molded foam article; and (d) removing the molded foam article from the mold. The IMR-enhancer compound is any liquid petroleum product within the viscosity range of products called oils. A molded foam article prepared in accordance with the method is also provided.

In its preferred embodiment, the method comprises first mixing the fatty acid condensation product, the IMR-enhancer compound, and the polyol to yield an enhanced IMR "B" side composition, followed by admixing the other components and then performing steps b–d. In an alternate embodiment, the fatty acid condensation product and the IMR-enhancer compound can first be added to the isocyanate to yield an enhanced IMR "A" side composition.

In an alternate embodiment, a method for preparing an enhanced IMR composition comprising reacting a fatty acid condensation product with an isocyanate in the presence of an IMR-enhancer compound, wherein the fatty acid condensation product has at least one active hydrogen containing group, is provided. An enhanced IMR composition prepared in accordance with the method of the alternate embodiment is provided.

DESCRIPTION OF THE INVENTION

In the generic embodiment of the present invention, the method comprises (a) forming a polyurethane-forming mixture by mixing (i) a fatty acid condensation product, (ii) an IMR-enhancer compound, (iii) an isocyanate, (iv) a polyol, (v) a catalyst, and (vi) a blowing agent; (b) filling a mold with the polyurethane-forming mixture; (c) forming a molded foam article; and (d) removing the molded foam article from the mold.

In the present invention, polyurethane refers a polyurethane compound obtained by the reaction of a polyol with an isocyanate.

Fatty acid condensation products suitable for the practice of the present invention can be prepared from fatty acids and alcohols, amino alcohols, amines or mixtures thereof. Useful fatty acids include saturated or unsaturated fatty acids.

Preferred are aliphatic acids. Suitable fatty acids include, but are not limited to, ricinoleic acid, oleic acid, alaidic acid, stearic acid, palmitic acid, linoleic acid, octanoic acids, coconut oil acids, tallow fatty acids, paraffin oxidation acids, and tall oil fatty acids. Preferred fatty acids are ricinoleic, oleic, adipic, and linoleic acids. The most preferred fatty acid is oleic acid. Diacids, such as adipic acid can also be used in the preparation of the fatty acid condensation product.

Several alcohols can be used to prepare esters suitable for practicing the present invention. Examples include butanol, hexanol, octanol isomers, dodecanol, oleyl alcohol, other fatty alcohols, natural or synthetic steroid alcohols, ethylene glycol, propylene glycol, butanediol, hexanediol, glycerol, polyglycerol, trimethylolpropane, pentaerythritol, sorbitol, hexitol, various sugars, and addition products of alkylene oxides such as ethylene oxide or propylene oxide. Preferred fatty esters can be obtained from the condensation of carboxylic acids and alcohols.

Several amines and amino alcohols are also useful in practicing the present invention. Examples include ammonia, monoalkylamines such as methylamine, dialkylamines such as diethylamine, and amine alkoxylation products such as ethanolamine.

Fatty acid esters of the present invention can be prepared by known methods. For example, a fatty acid ester suitable for the practice of the present invention can be prepared by condensation of an alcohol and a fatty acid at elevated temperatures. The temperature at which the reaction is conducted can be any temperature at which water is formed by reaction of the acid with the alcohol.

The reaction is preferably conducted at a temperature above about 100° C., more preferably above about 120° C., most preferably above about 150° C. and less than about 200° C. The esterification reaction can optionally be conducted in a vacuum. Water can optionally be removed form the reaction mixture by azeotropic distillation.

A fatty acid condensation product is effective as IMR agent in amounts that allow removal of the molded foam article without destroying the article. An effective amount is in the range of from about 2 to about 15 wt %, based on the weight of the polyurethane-forming mixture. Preferably, the effective amount is within the range of from about 5 to about 10 wt %.

An IMR-enhancer compound of the present invention is any liquid product of petroleum within the viscosity range of products called oils. Examples of such oils are those commonly referred to as mineral oils. The preferred mineral oils are those known in the art as white mineral oils.

An IMR-enhancer compound is effective when it is added in amount sufficient to reduce the force to remove the molded foam article from the mold. The IMR-enhancer compound can be added in any amount within the range of from about 10 to about 100 wt % based on the weight of the fatty acid condensation product. Preferably, the IMR-enhancer compound is added in an amount within the range of from about 80 to about 90 wt %.

Any isocyanate or polyisocyanate known and used in the art of preparing molded foams can be suitable for the practice of the present invention, including aromatic and aliphatic isocyanates and polyisocyanates. The terms isocyanate and polyisocyanate are herein used interchangeably without limiting the scope of the individual terms. The isocyanate functionality can be present in an amount of from about 0.2 wt % to about 40 wt %.

U.S. Pat. No. 4,785,027, incorporated herein by reference, discloses isocyanate compounds useful in practicing the present invention. Examples of useful isocyanates include the isomers of toluene diisocyanate (TDI) such as 2,4-toluene diisocyanate and 2,6-toluene diisocyanate, prepolymers of TDI, bis(4-isocyanatophenyl)methane (MDI), prepolymers of MDI, bis(isocyanatoethyl fumerate), dianisidine diisocyanate, toluidine diisocyanate, ethylene diisocyanate, 1,4-tetramethylene diisocyanate, 1,6-hexamethylene diisocyanate, 1,12-dodecane diisocyanate, cyclobutane-1,3-diisocyanate, 1,5-diisocyanato-3,3,5-trimethylcyclohexane, 2,4-hexahydrotoluene diisocyanate, 2,6-hexahydrotoluene diisocyanate, perhydro-2,4'-diphenylmethane diisocyanate, perhydro-2,6'-diphenylmethane diisocyanate, and mixtures thereof. Preferred isocyanate compounds include TDI, MDI, prepolymers of TDI, prepolymers of MDI, and mixtures thereof.

Any compound with multifunctional active hydrogen containing groups can be used in the practice of the present invention. The term "active hydrogen compound" refers to a compound that will react with an isocyanate to form an adduct between the active hydrogen containing compound and the isocyanate. Active hydrogen compounds can be described as compounds having functional groups that contain at least one hydrogen atom bonded directly to an electronegative atom such as nitrogen, oxygen or sulfur.

Polyols useful in practicing the present invention are generally known and are described in such publications as *High Polymers*, Vol. XVI, "Polyurethanes, Chemistry and Technology" by Saunders and Frisch, Interscience Publishers, New York, Vol. I, pp. 32–42, 44–54 (1962) and Vol. II, pp. 5–6, 198–199 (1964); *Organic Polymer Chemistry* by K. J. Saunders, Chapman and Hall, London, pp. 323–325 (1973); *Developments in Polyurethanes*, Vol. I, J. M. Burst, ed., Applied Science Publishers, pp. 1–76 (1978); and *Reaction Polymers*, W. Gum, W. Riese, and H. Ulrich, Eds., Hanser Publishers (1992), incorporated herein by reference. Suitable polyols have molecular weights of less than about 6000.

Examples of such polyols include (a) alkylene oxide adducts of polyhydroxyalkanes; (b) alkylene oxide adducts of non-reducing sugars and sugar derivatives; (c) alkylene oxide adducts of polyphenols; and (d) alkylene oxide adducts of amines and amine polyols.

Alcohols and amines are examples of other active hydrogen compounds that are useful in practicing the present invention.

Examples of catalysts useful in practicing the present invention include tertiary amine catalysts such as triethylene diamine, N-methyl morpholine, N-ethyl morpholine, diethylethanolamine, N-coco morpholine, 1-methyl-4-dimethylaminoethyl piperazine, and bis(N,N-dimethylaminoethyl) ether. Amine catalysts are usually used in an amount of from about 0.1 to about 5, preferably from about 0.2 to about 2 parts per 100 parts of polyol formulation.

Organometallic catalysts are also suitable. Examples include organolead, organoiron, organomercury, organobismuth, and preferably organotin compounds. Most preferred are organotin compounds such as dibutyltin dilaurate, dimethyltin dilaurate, stannous octoate, stannous chloride and similar compounds. Organometallic compounds are usually used in an amount from about 0.05 to about 2.0 parts per 100 parts of active hydrogen containing compound formulation.

Blowing agents useful for practicing the present invention include any gas or any material that generates a gas under the conditions of the reaction of the active hydrogen containing compound with an isocyanate. Examples of blowing agents include carbon dioxide, water, low-boiling hydrocarbons, halogenated hydrocarbons, and nitrogen-releasing azo-compounds. Suitable low-boiling hydrocarbons include pentane, hexane, heptane, pentene, and heptene. Suitable halogenated hydrocarbons include dichlorodifluoromethane, trichlorofluoromethane, 1,1,1-trichloroethane, and methylene chloride. Water and mixtures with low boiling hydrocarbons or halogenated hydrocarbons are preferred.

The "B" side of the present invention can include other components, such as copolymer polyols, surfactants, mold release agents (not of the present invention), fillers, flame retardants, and reinforcing fibers.

Examples of copolymer polyols suitable for practicing the present invention are disclosed in U.S. Pat. No. 4,581,418, incorporated herein by reference. Suitable copolymer polyols are derived from polymerizable ethylenically unsaturated monomers. Examples of monomers used to prepare copolymer polyols useful in the present invention include aliphatic conjugated dienes such as butadiene; monovinylidine aromatics such as styrene, $\alpha$-methylstyrene and vinylnapthalene, including other inertly substituted styrenes; $\alpha,\beta$-ethylenically unsaturated carboxylic acids and esters such as acrylic acid, methacrylic acid, 2-hydroxyethacrylic acid and other similar compounds; $\alpha,\beta$-ethylenically unsaturated nitriles such as acrylonitrile; acrylamide; vinyl esters such as vinyl acetate; vinyl ethers; vinyl ketones; and vinyl and vinylidene halides.

Examples of surfactants include silicone surfactants, polyethylene glycol ethers of long chain alcohols, tertiary amine or alkanolamine salts of long chain alkyl sulfate esters, alkyl sulfonic esters and alkylaryl sulfonic acids. Silicone surfactants include block copolymers containing at least one polyoxyalkylene segment and one poly(dimethylsiloxane) segment.

U.S. Pat. Nos. 4,868,224; 5,019,317; and 5,389,696, incorporated herein by reference, disclose examples of IMR agents which can be included in the "B" side of the present invention.

The present invention can also use crosslinkers. Examples of crosslinkers include diethanolamine and methylene bis (o-chloroaniline).

In its preferred embodiment, the method comprises first mixing the fatty acid condensation product, the IMR-enhancer compound, and the polyol to yield an enhanced IMR "B" side composition, followed by admixing the other components and then performing steps b–d of the generic embodiment. In an alternate embodiment, the fatty acid condensation product and the IMR-enhancer compound can first be added to the isocyanate to yield an enhanced IMR "A" side composition. A molded foam article is prepared in accordance with the methods of the present invention.

In another alternate embodiment, a portion of the fatty acid condensation product, a portion of the IMR-enhancer compound, and the isocyanate are first mixed to yield an enhanced IMR "A" side composition and the residual portion of the fatty acid condensation product, the residual portion of the IMR-enhancer compound, and the polyol are mixed to yield an enhanced IMR "B" side composition. Then, steps b–d are performed.

In an alternate embodiment, a method for preparing an enhanced IMR composition comprises reacting a fatty acid condensation product with an isocyanate in the presence of an IMR-enhancer compound, wherein the fatty acid condensation product has at least one active hydrogen containing group. In this embodiment, an enhanced IMR composition is prepared in accordance with the method of the alternate embodiment. Moreover, the enhanced IMR composition is admixed during the "forming a polyurethane-forming mixture" of the generic embodiment of the present invention.

The embodiments described herein are given to illustrate the scope and spirit of the present invention. The embodiments herein will make apparent to those skilled in the art other embodiments that may also be used. These other embodiments are within the scope of the present invention. Thus, the scope of the invention should be determined by the appended claims and their legal equivalents, rather than by the embodiments given herein.

EXAMPLES

The following examples merely exemplify various embodiments of the invention. It is understood that the following examples are provided to further illustrate the invention. They do not in anyway limit the scope of the present invention.

Table of Compounds

The following compounds were used in the preparation of the exemplified dispersions. The table provides the compound's generic name, its trade mark name, and its vendor.

| Generic Name | Trademark | Vendor |
| --- | --- | --- |
| propylene oxide polyol, 165 molecular weight | VORANOL ™ 2025 Polyol | The Dow Chemical Company |
| propylene oxide polyol, 1000 molecular weight | VORANOL ™ 230-112 Polyol | The Dow Chemical Company |
| propylene oxide polyol, 165 molecular weight | VORANOL ™ 230-660 Polyol | The Dow Chemical Company |
| propylene oxide polyol initiated with ethylene diamine, 340 molecular weight | VORANOL ™ RA640 Polyol | The Dow Chemical Company |
| polymethylene polyphenyl isocyanate containing 4,4'-methylene bisphenyl isocyanate | PAPI ™ 27 MDI | The Dow Chemical Company |
| polymethylene polyphenyl isocyanate containing 4,4'-methylene bis-phenyl isocyanate | PAPI ™ 94 MDI | The Dow Chemical Company |
| polymethylene polyphenyl isocyanate containing 4,4'-methylene bis-phenyl isocyanate | PAPI ™ 95 MDI | The Dow Chemical Company |
| 33% triethylene diamine in dipropylene glycol | Dabco 33LV | Air Products and Chemicals Inc. |
| methyl azanorbornane | Dabco AN10 | Air Products and Chemicals Inc. |
| pentamethyl diethylene triamine | Polycat 5 | Air Products and Chemicals Inc. |
| polyether-modified polysiloxane | Tagostab B8418 | The Goldschmidt Company |
| polyether-modified polysiloxane | Tagostab 8427 | The Goldschmidt Company |
| Complex ester of pentaerythritol, adipic acid, and oleic acid with low hydroxyl content | Loxiol G71S | The Henkel Corporation |
| polyethylene wax | Chem Tren 2004 | Chem Tren |
| decaglycerol tertaoleate | Drewpol 10-4-O | Stepan |
| decaglycerol decaoleate | Polyaldol DGDO | Lonza Speciality Chemicals |
| tallamidopropyl dimethylamine | Shercodine T | Scher Chemicals |
| tallamidopropyl dimethylamine | Lexamine T-13 | Inolex Chemical Company |
| tallaic salt of tallamidopropyl dimethylamine | Lexamine T-13T | Inolex Chemical Company |

-continued

| Generic Name | Trademark | Vendor |
|---|---|---|
| pentaerythritol oleate adipate | Inolex POA | Inolex Chemical Company |

Example Nos. 1–10

For Example Nos. 1–10, molded foam articles were prepared. The molded foam articles were-prepared with "A" and "B" side formulations. The IMR-enhancer compound was added to the "B" side formulations, in accordance with the preferred embodiment of the present invention.

A heated mold was used to form the molded form article. The mold cavity was made of aluminum and maintained at 120° F. (49° C.). The cavity was approximately 3" (7.62 cm) in diameter with a 1" (2.54 cm)×3° draw. The mold core was made of stainless steel and maintained at 150° F. (66° C.).

A single light coating of external mold release (Chem Tren 2004 polyethylene wax) was applied to the core. When closed, the mold had a gap of 0.17" (cm). With the mold open, a 7"×7"×0.75" (17.8 cm×17.8 cm×1.9 cm) polyvinyl-chloride (PVC) coverstock sheet was placed over the cavity, and a one ounce (28.4 gm) glass mat was placed on top of the PVC.

The polyol formulation ("B" side) was mixed with the polymeric isocyanate ("A" side) in a desired ratio and poured onto the PVC sheet overlaid with glass mat. The mold was closed for 2 minutes, then opened and the molded foam article was removed by simply pulling it off of the core.

The force required to remove the molded foam article from the mold was measured qualitatively. A value of 1 indicated that no force was required, 2 indicated that some force was required, 3 indicated that a lot of force required, 4 indicated that some type of tool required to loosen the molded foam article, and 5 indicated that the molded foam article strongly adhered to the mold and that the article could not be removed without damage to the molded foam article.

Successive quantities of the polyurethane-forming mixture were added to the mold until (1) a value of 4 was achieved or (2) at least twelve molded foam articles were prepared. Each set of quantities was formed into molded foam articles, which together make up an Example. The external mold release agent was not replenished between the successive additions. The release value was recorded through preparation of the twelfth article.

1. Example Nos. 1 and 2

Example No. 1 was prepared using 45% PAPI™ 94 MDI, 45% PAPI™ 95 MDI, and 10% Polyaldol DGDO on the "A" side. The "B" side formulation contained 60 parts VORANOL™ 2025 polyol, 30 parts VORANOL™ 230-112 polyol, 5 parts glycerine, 1.5 parts water, 2.0 parts Dabco 33LV, 0.5 parts Tagostab 8427, and 1.0 parts Polycat 5. The ratio of A:B was 1.8:1.

Example No. 2 was prepared using the same formulations as in Example No. 1, except (1) 2.0 parts Tagostab B8418 replaced the 0.5 parts Tagostab 8427 and (2) 14 parts mineral oil was added on the "B" side. The ratio of A:B was 1.5:1.

Articles for Example No. 1

| Article No. | Release Value |
|---|---|
| 1 | 1 |
| 2 | 1 |
| 3 | 1.5 |
| 4 | 2 |
| 5 | 3 |
| 6 | 4 |

Articles for Example No. 2

| Article No. | Release Value |
|---|---|
| 1 | 1 |
| 2 | 1 |
| 3 | 1 |
| 4 | 1 |
| 5 | 1.5 |
| 6 | 1.5 |
| 7 | 2 |
| 8 | 3 |
| 9 | 4 |

A comparison of Example Nos. 1 and 2 clearly shows the advantage of using mineral oil as an IMR-enhancer compound.

2. Example Nos. 3 and 4

Example No. 3 was prepared using 100% PAPI™ 27 MDI on the "A" side. The "B" side formulation contained 42 parts VORANOL™ 2025 polyol, 33.6 parts VORANOL™ 230-112 polyol, 8.4 parts glycerine, 2.0 parts water, 1.5 parts Dabco 33LV, 2.82 parts oleic acid, 3.66 parts Lexamine T-13, 2.0 parts Tagostab B8418, 1.5 parts Polycat 5, 12.0 parts mineral oil, and 14.0 parts Loxiol G71S. The ratio of A:B was 1.2:1.

Example No. 4 was prepared using 100% PAPI™ 94 MDI on the "A" side. The "B" side formulation was the same as used in Example No. 3, except (1) tall oil acid replaced oleic acid, (2) Shercodine T replaced Lexamine T-13, and (3) mineral oil was not added. The ratio of A:B was 1.35:1.

Articles for Example No. 3

| Article No. | Release Value |
|---|---|
| 1 | 1.5 |
| 2 | 1.5 |
| 3 | 1.5 |
| 4 | 1.5 |
| 5 | 1.5 |
| 6 | 1.5 |
| 7 | 1.5 |
| 8 | 1 |
| 9 | 1 |
| 10 | 1.5 |
| 11 | 1 |
| 12 | 1.5 |

| Articles for Example No. 4 | |
|---|---|
| Article No. | Release Value |
| 1 | 1 |
| 2 | 1 |
| 3 | 1.5 |
| 4 | 1.5 |
| 5 | 1.5 |
| 6 | 2 |
| 7 | 2 |
| 8 | 2 |
| 9 | 2 |
| 10 | 2 |
| 11 | 2 |
| 12 | 2 |

The data shows that the absence of mineral oil makes removal of the article from the mold more difficult.

3. Example No. 5

Example No. 5 was prepared using 100% PAPI™ 27 MDI on the "A" side. The "B" side formulation contained 42 parts VORANOL™ 2025 polyol, 33.6 parts VORANOL™ 230-112 polyol, 8.4 parts glycerine, 2.0 parts water, 1.5 parts Dabco 33LV, 2.82 parts tall oil acid, 3.66 parts Shercodine T, 2.0 parts Tagostab B8418, 1.5 parts Polycat 5, and 12.0 parts mineral oil. The ratio of A:B was 1.35:1.

| Articles for Example No. 5 | |
|---|---|
| Article No. | Release Value |
| 1 | 1 |
| 2 | 1.5 |
| 3 | 2 |
| 4 | 4 |

The data indicates that mineral oil alone is not an effective internal mold release agent.

4. Example Nos. 6–8

Example No. 6 was prepared using 100% PAPI™ 94 MDI on the "A" side. The "B" side formulation contained 50 parts VORANOL™ 230-660 polyol, 30 parts VORANOL™ 230-112 polyol, 8.0 parts glycerine, 2.0 parts water, 1.5 parts Dabco 33LV, 2.0 parts Tagostab B8418, 1.5 parts Polycat 5, and 30 parts Loxiol G71S. The ratio of A:B was 1.3:1.

Example No. 7 was prepared using the formulations of Example No. 6, except the "B" side formulation also contained 14 parts mineral oil. The ratio of A:B was 1.15:1.

Example No. 8 was prepared using the formulations of Example No. 6, except (1) the Loxiol G71S was not added and (2) 14 parts mineral oil was added. The ratio of A:B was 1.45:1.

| Articles for Example No. 6 | |
|---|---|
| Article No. | Release Value |
| 1 | 1.5 |
| 2 | 1.5 |
| 3 | 1.5 |
| 4 | 1.5 |
| 5 | 1.5 |
| 6 | 1.5 |
| 7 | 1.5 |
| 8 | 1.5 |
| 9 | 1.5 |
| 10 | 1.5 |
| 11 | 1.5 |
| 12 | 1.5 |

| Articles for Example No. 7 | |
|---|---|
| Article No. | Release Value |
| 1 | 1 |
| 2 | 1 |
| 3 | 1 |
| 4 | 1 |
| 5 | 1 |
| 6 | 1 |
| 7 | 1 |
| 8 | 1 |
| 9 | 1 |
| 10 | 1 |
| 11 | 1 |
| 12 | 1 |

| Articles for Example No. 8 | |
|---|---|
| Article No. | Release Value |
| 1 | 1 |
| 2 | 1.5 |
| 3 | 2 |
| 4 | 4 |

This data shows the advantage of using a mineral oil as an IMR-enhancer compound.

5. Example Nos. 9 and 10

Example No. 9 was prepared using 100% PAPI™ 94 MDI on the "A" side. The "B" side formulation contained 50 parts VORANOL™ 2025 polyol, 40 parts VORANOL™ 230-112 polyol, 10 parts glycerine, 2.0 parts water, 8.34 parts Lexamine T-13T, 0.26 parts oleic acid, 2.0 parts Tagostab B8418, 1.5 parts Dabco AN10, and 30 parts Inolex POA. The ratio of A:B was 1.2:1.

Example No. 10 was prepared using the formulations of Example No. 9, except (1) tall oil acid replaced oleic acid and (2) 14.0 parts mineral oil was added to the "B" side formulation. The ratio of A:B was 1.6:1.5.

| Articles for Example No. 9 | |
|---|---|
| Article No. | Release Value |
| 1 | 1 |
| 2 | 1 |

-continued

Articles for Example No. 9

| Article No. | Release Value |
|---|---|
| 3 | 1 |
| 4 | 1 |
| 5 | 1.5 |
| 6 | 4 |
| 7 | 2 |
| 8 | 4 |
| 9 | 4 |

Articles for Example No. 10

| Article No. | Release Value |
|---|---|
| 1 | 1 |
| 2 | 1 |
| 3 | 1 |
| 4 | 1 |
| 5 | 1 |
| 6 | 1 |
| 7 | 1.5 |
| 8 | 2 |
| 9 | 2 |
| 10 | 3 |
| 11 | 4 |
| 12 | 4 |

This data shows the advantage of using an IMR-enhancer compound such as mineral is oil.

What is claimed is:

1. A method for preparing a molded foam article comprising:
   a. forming a polyurethane-forming mixture by mixing
      i. an internal mold release agent consisting of a fatty acid condensation product;
      ii. an IMR-enhancer compound consisting of a petroleum oil;
      iii. an isocyanate;
      iv. a polyol;
      v. a catalyst; and
      vi. a blowing agent;
   b. filling a mold with the polyurethane-forming mixture;
   c. forming a molded foam article; and
   d. removing the molded foam article from the mold.

2. The method of claim 1, wherein the fatty acid condensation product, the IMR enhancer compound, and the isocyanate are first mixed to yield an enhanced IMR "A" side composition.

3. The method of claim 1, wherein the fatty acid condensation product, the IMR enhancer compound, and the polyol are first mixed to yield an enhanced IMR "B" side composition.

4. The method of claim 1, wherein a portion of the fatty acid condensation product, a portion of the IMR-enhancer compound, and the isocyanate are first mixed to yield an enhanced IMR "A" side composition and wherein the residual portion of the fatty acid condensation product, the residual portion of the IMR-enhancer compound, and the polyol are mixed to yield an enhanced "B" side composition.

5. The method of claim 1, wherein fatty acid condensation product is a condensation product of a fatty acid selected from the group consisting of ricinoleic acid, oleic acid, alaidic acid, stearic acid, palmitic acid, linoleic acid, octanoic acid, coconut oil acids, tallow fatty acid, paraffin oxidation acids, and tall oil fatty acid and the IMR-enhancer compound is mineral oil.

6. The method of claim 1, wherein the polyurethane-forming mixture is formed by preparing an enhanced IMR composition by reacting the fatty acid condensation product with the isocyanate in the presence of the IMR-enhancer compound, wherein the fatty acid condensation product has at least one active hydrogen containing group.

7. The method of claim 5, wherein the condensation product is a product of the fatty acid and an alcohol, amine or a mixture thereof.

8. The method of claim 7, wherein the condensation product is a product of the fatty acid and an alcohol and/or amino alcohol.

9. The method of claim 8, wherein the alcohol is selected from butanol, hexanol, octanol, dodecanol, oleyl alcohol, natural or synthetic steroid alcohol, ethylene glycol, propylene glycol, butanediol, hexanediol, glycerol, polyglycerol, trimethylolpropane, pentaerythritol, sorbitol, hexitol, a sugar and an addition product of an alkylene oxide.

10. The method of claim 7, wherein the condensation product is a product of the fatty acid and an amino alcohol or an amine.

11. The method of claim 10, wherein the amino alcohol or amine is selected from ammonia, a monoalkylamine, a dialkylamine or an amine alkoxylation product.

12. The method of claim 1, wherein the amount of IMR-enhancer compound in die polyurethane-forming mixture is an amount sufficient to reduce the force required to remove the molded foam article form the mold.

* * * * *

UNITED STATES PATENT AND TRADEMARK OFFICE
CERTIFICATE OF CORRECTION

| | | |
|---|---|---|
| PATENT NO. | : 7,195,726 B1 | Page 1 of 1 |
| APPLICATION NO. | : 09/762545 | |
| DATED | : March 27, 2007 | |
| INVENTOR(S) | : Ron H. Niswander | |

It is certified that error appears in the above-identified patent and that said Letters Patent is hereby corrected as shown below:

In column 12, Claim 12, line 49, "die" should read -- the --.

In column 12, Claim 12, line 51, "form" should read -- from --.

Signed and Sealed this

Seventh Day of August, 2007

JON W. DUDAS
*Director of the United States Patent and Trademark Office*